United States Patent
Behm et al.

(10) Patent No.: US 7,895,008 B2
(45) Date of Patent: Feb. 22, 2011

(54) METHOD OF PERFORMING MEASUREMENT SAMPLING OF LOTS IN A MANUFACTURING PROCESS

(75) Inventors: Gary W. Behm, Hopewell Junction, NY (US); Yue Li, Hopewell Junction, NY (US); Malek Ben Salem, Wappingers Falls, NY (US); Keith Tabakman, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 12/049,565

(22) Filed: Mar. 17, 2008

(65) Prior Publication Data
US 2009/0234485 A1    Sep. 17, 2009

(51) Int. Cl.
*G01N 37/00* (2006.01)
(52) U.S. Cl. ...................................... 702/82
(58) Field of Classification Search .................. 702/82
See application file for complete search history.

(56) References Cited

U.S. PATENT DOCUMENTS

| | | | |
|---|---|---|---|
| 6,950,716 B2 * | 9/2005 | Ward et al. | 700/121 |
| 7,129,099 B2 * | 10/2006 | Ishii et al. | 438/14 |
| 2002/0193899 A1 * | 12/2002 | Shanmugasundram et al. | 700/108 |

* cited by examiner

*Primary Examiner*—Aditya Bhat
(74) *Attorney, Agent, or Firm*—Cantor Colburn LLP; Wenjie Li

(57) ABSTRACT

A method of performing measurement sampling in a production process includes passing a lot through a manufacturing process, employing a set of combinational logistics to determine if sampling is indicated and, if sampling is indicated, establishing a sampling decision. The method further requires querying a set of lot sampling rules to evaluate the sampling decision, evaluating a statistical quality of the process if no lot sampling rules exist, and automatically determining whether the lot passing through the production process requires sampling based on the combinational logistics, statistical quality and lot sampling rules.

22 Claims, 3 Drawing Sheets

METHOD OF PERFORMING MEASUREMENT SAMPLING OF LOTS IN A MANUFACTURING PROCESS

BACKGROUND OF THE INVENTION

1. Field of the Invention

This invention relates to the art of manufacturing and, more particularly, to a method of performing measurement sampling of lots in a production process.

2. Description of Background

Conventionally, measurement sampling is determined by a lot attribute assigned at a beginning or early stage of a manufacturing process. The attribute assured that a certain percentage of work-in-progress (WIP) was measured at various inspection points before and/or after each operation of a production process. Unfortunately, the attribute did not account for performance of the operation. Towards that end, a manual query was created to suggest a sample rate based on process capacity. However, being manually run, changing/adjusting the sample rate is a labor intensive and time consuming process and thus not performed very often.

Another challenge is created by "Send Ahead" (SAHD) operations. In normal manufacturing operations, there is no need to use, for example, SAHD wafers. However, when tolerance variation in a particular process is unacceptable, SAHD is required in order to prevent scrap. SAHD is also necessary for low volume parts to speed yield learning. In either case, no SAHD lot should be skipped by a sampling plan. When relying on an attribute to determine sampling, many SAHD lots are not sampled. Without real time integrated product and process information, it is difficult, if not impossible, to establish a sampling rate that can account for a lot attribute, process performance, and SAHD lots in a manufacturing process. When relying solely on a lot attribute, or manual sampling, a lot may be sampled too often, or not often enough. Sampling, i.e., measurement is a non-value added operation and actually slows production. Thus, over sampling can be costly. However, if too few lots are sampled, defective lots can pass through production. In this case, final testing costs are increased and a company's reputation for quality is at risk.

SUMMARY OF THE INVENTION

The shortcomings of the prior art are overcome and additional advantages are provided through the provision of a method of performing measurement sampling in a production process. The method includes passing a lot through a production process, employing a set of combinational logistics to determine if sampling is indicated and, if sampling is indicated, establishing a sampling decision. The method further requires querying a set of lot sampling rules to evaluate the sampling decision, evaluating a statistical quality of the process if no lot sampling rules exist, and automatically determining whether the lot passing through the production process requires sampling based on the combinational logistics, statistical quality and lot sampling rules.

System and computer program products corresponding to the above-summarized methods are also described and claimed herein.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

TECHNICAL EFFECTS

As a result of the summarized invention, technically we have achieved a solution which optimizes non-value added steps in a manufacturing process by determining when lot sampling is necessary in order to effectively eliminate both over and under sampling so as to reduce manufacturing costs and increase overall manufacturing quality.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features thereof, by way of example with reference to the drawings.

DETAILED DESCRIPTION OF THE INVENTION

Figure 1:
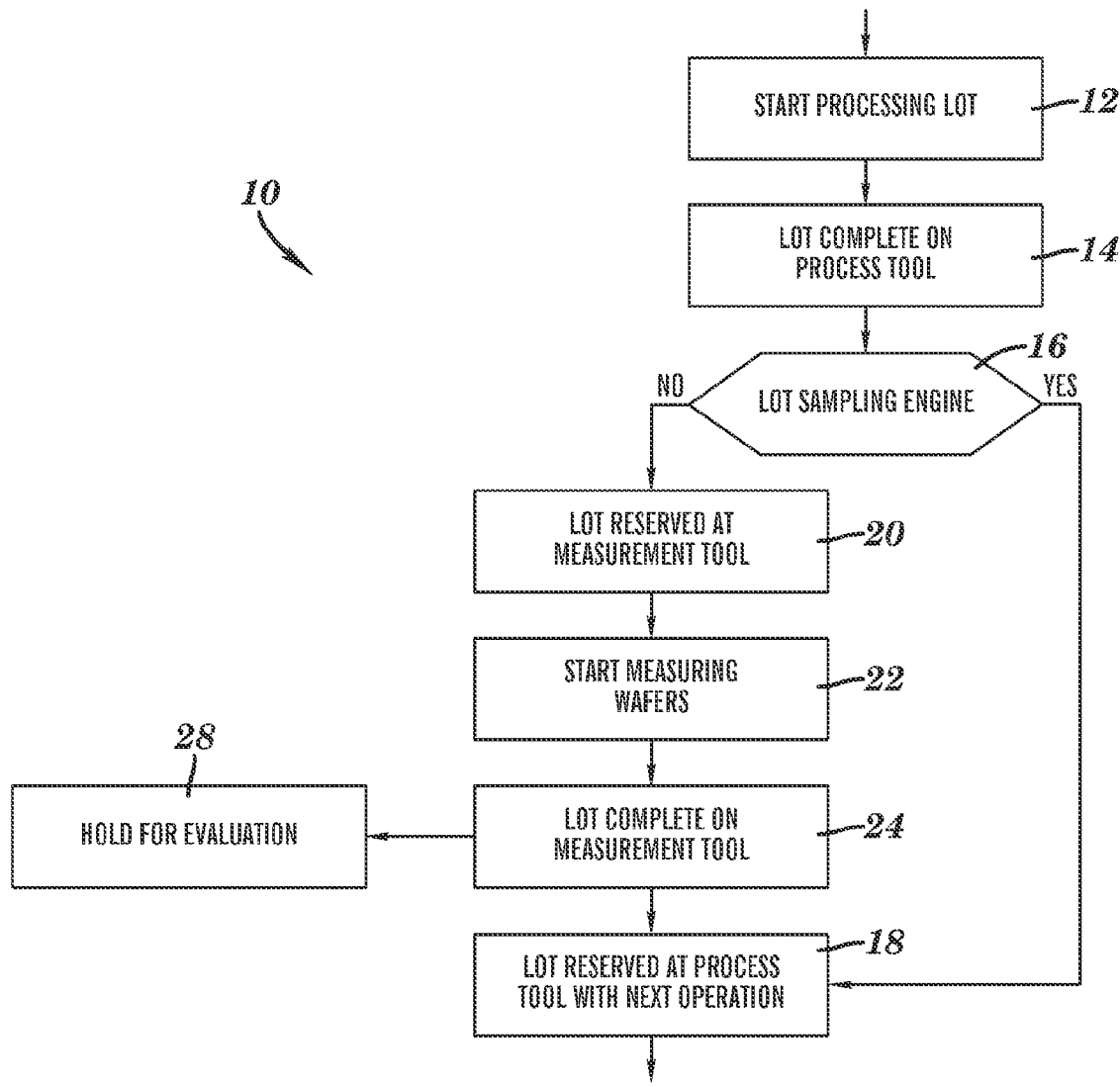
FIG. 1 is a flow diagram depicting a manufacturing process having sampling system in accordance with exemplary embodiments of the present invention.

Turning now to the drawings in greater detail, it will be seen that in FIG. 1 there is shown a flow diagram illustrating a production process 10. In the exemplary embodiment shown, production process 10 is employed in the manufacture of semiconductors. Also, it should also be understood that the term "production process" includes pre-production, e.g., test and development, and post production, e.g., quality assurance processes. It should be understood, that the present invention can be employed in a wide array of production processes. In any event, at the outset of production process 10, a lot is processed by a tool, which performs one or more operations designed to form a semiconductor as indicated in block 12. When the operation(s) is complete, as indicated in block 14, the lot is passed to a lot measurement zone having a lot sampling engine (LSE) as shown in block 16.

As will be discussed more fully below, the lot sampling engine determines, as shown in block 16, whether the lot requires sampling, e.g., measurement(s) to determine that the lot is within defined parameters or whether the lot should pass directly to the next process, as indicated in block 18. If in block 16, a determination is made that sampling is indicated, the lot is reserved at a measurement tool, as indicated at block 20 and measured as indicated in block 22. Upon completing any necessary measurements, as indicated in block 24, the lot is passed to the next tool in the process as indicated in block 18 or, if sampling reveals a problem, the lot is held for evaluation as indicated in block 28.

Figure 2:
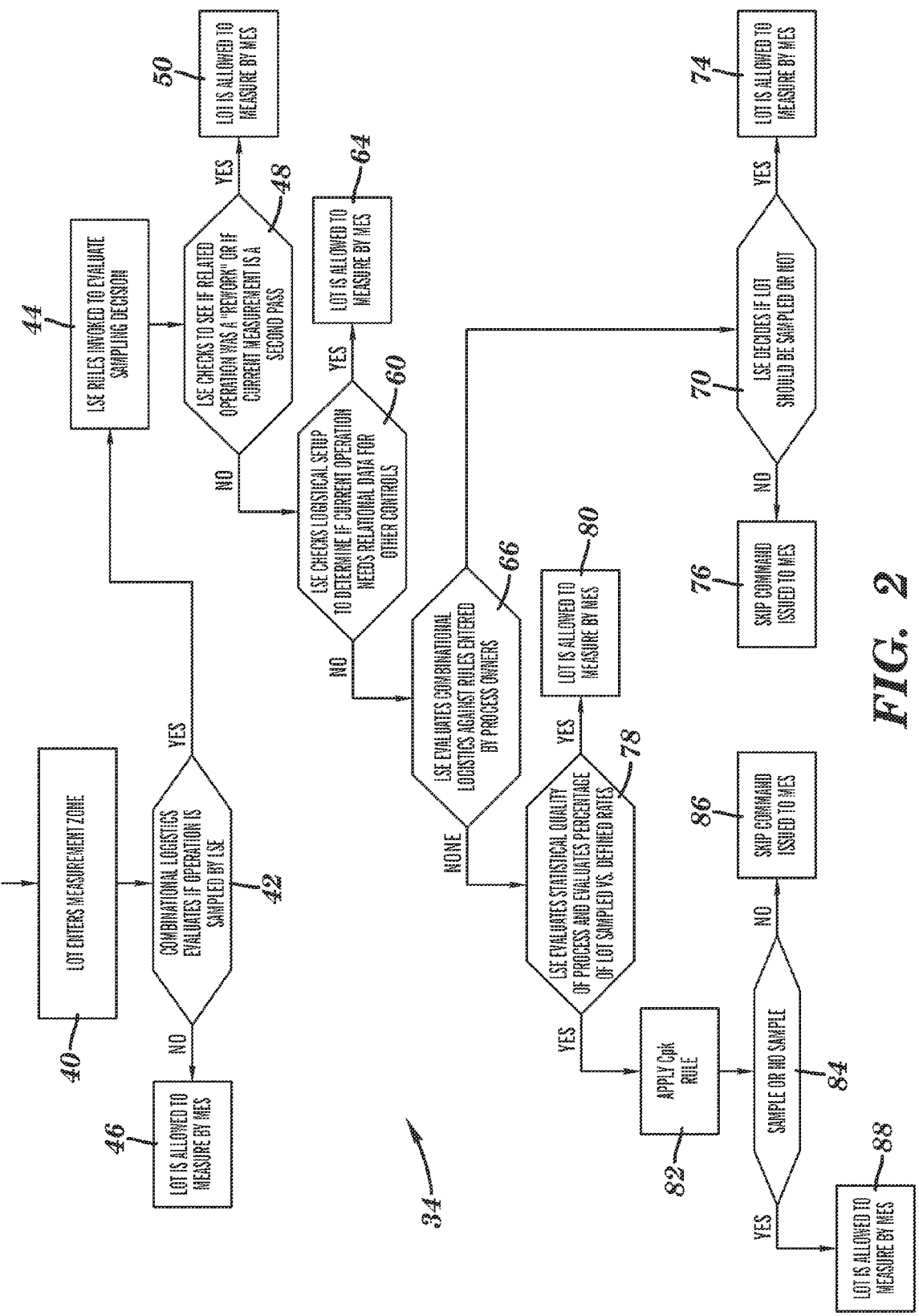
FIG. 2 is a flow diagram illustrating a method of sampling lots in accordance with exemplary embodiments of the present invention.

As this point reference will be made to FIG. 2 in describing a method 34, employed by the lot sampling engine in block 16, for determining when sampling is indicated. As noted above, upon completion of an operation(s) at the tool, the lot enters a lot measurement zone as indicated in block 40. After entering the lot measurement zone, the lot sampling engine employs combinational logistics to evaluate whether the operation(s) performed on the lot require that the lot be sampled and establish a sampling decision as indicated in block 42. Combinational logistics includes process definition identifiers, route identifiers and the like, which form logical recipes associated with each operation. If the lot meets specific data requirement information (Lot sampling rules), the lot sampling engine evaluates the sampling decision, in block 44. If the specific data requirement information is not met, the measured by a manufacturing execution system (MES) as indicated in block 46.

At this point, the lot sampling engine checks whether the operation represented a re-work of the lot, or if the lot is passing through the operation for a second time as indicated in block 48. If the lot is being re-worked, or passed through the operation a second time, sampling is indicated and the lot is passed to the manufacturing execution system for measurement as indicated in block 50. If the lot is not being re-worked, or passed through the operation a second time, the lot sampling engine checks a logistical setup of the tool to determine whether the operation requires relational data for other controls as indicated in block 60. If the operation requires relational data for other controls, such as, making sure that measurement changes or other process data are obtained, the lot is measured by the manufacturing execution system as indicated in block 64, otherwise the lot sampling engine evaluates process specific rules entered by a lot sampling engine administrator in block 66.

That is, over time and with experience, a process performance history is established for each tool. Technicians and engineers evaluate the history of each tool and through test, evaluation and experience develop a set of operation specific rules that are evaluated by the lot sampling engine. If a rule is found, the lot sampling engine determines whether the rule indicates sampling in block 70. If sampling is indicated, the lot is measured by the manufacturing execution system as indicated in block 74, otherwise the lot sampling engine issues a skip command in block 76 that is received in block 18 of production process 10. If, however, no rule is found in block 66, the lot sampling engine evaluates a statistical quality of the operation, and a percentage of lots sampled vs. a predefined sampling threshold as indicated in block 78. The lot sampling engine employs a process capability (Cpk) index to statistically evaluate the operation. Once the statistical analysis is complete, the lot is measured by the manufacturing execution system as indicated in block 80, or a CpK rule is applied as indicated in block 82. Of course, at anytime, engineers, technicians, production personnel and the like can modify a sampling rule enforce measurement or skip decision as indicated in block 44 when sampling is deemed necessary. Based on the Cpk rule applied in block 82, a sampling decision is made in block 84. If no sampling is indicated, a lot skip command is issued in block 86. If a need for sampling is indicated, the lot is measured by the manufacturing execution system as indicated in block 88.

At this point it should be appreciated that the present invention provides a method of determining, with greater reliability, whether a lot or lots in a production process require sampling. By carefully evaluating each lot, over sampling and under sampling is significantly reduced. In this manner, costs associated with non-valued added operations, i.e., measurement, are significantly reduced thereby creating greater efficiencies in the production process.

Figure 3:
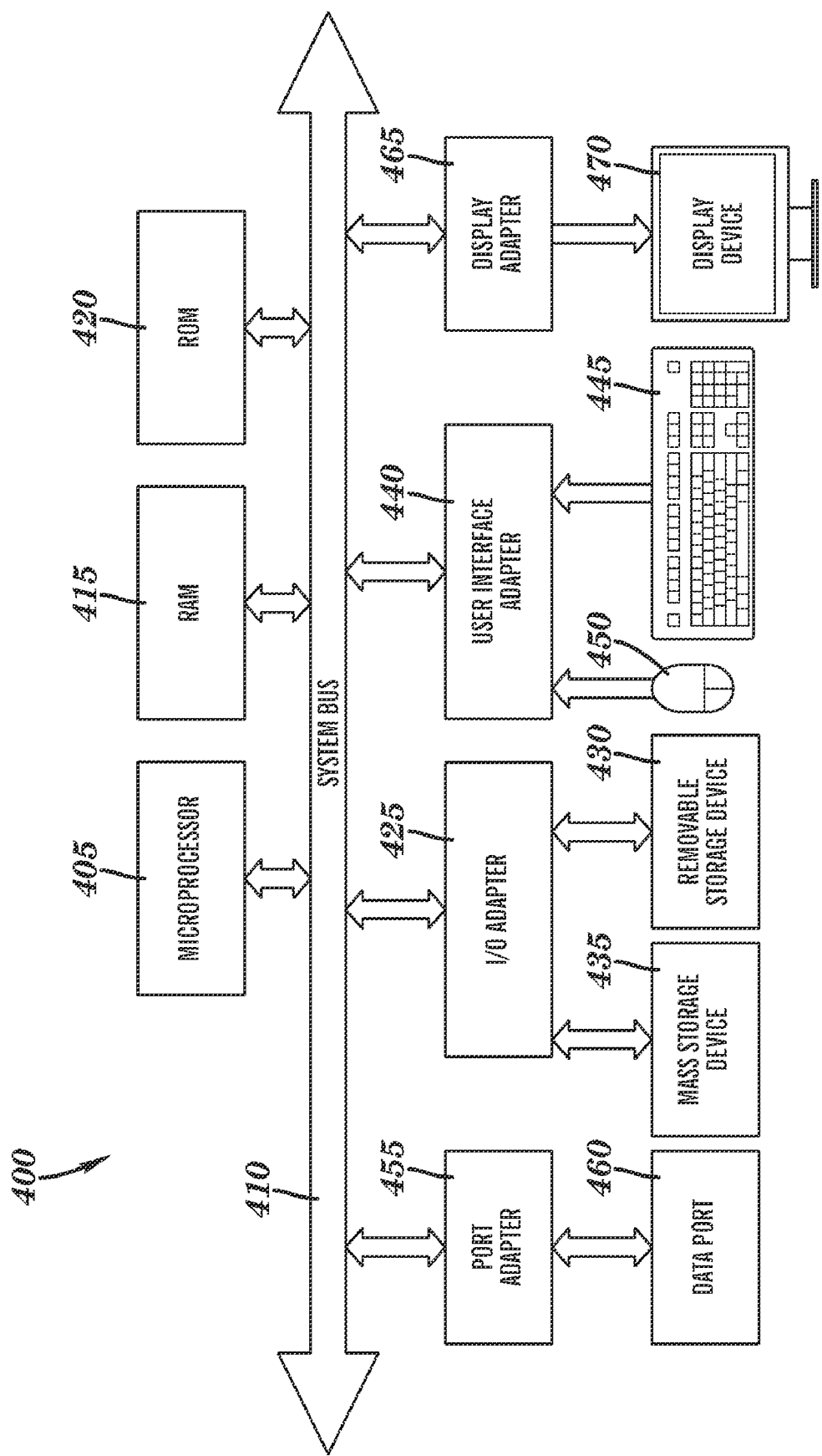
FIG. 3 is a block diagram of a computer system employed in connection with the lot sampling method in accordance with exemplary embodiments of the present invention.

Generally, the method of performing measurement sampling of lots in a production process described herein is practiced with a general-purpose computer and the method may be coded as a set of instructions on removable or hard media for use by the general-purpose computer. FIG. 3 is a schematic block diagram of a general-purpose computer suitable for practicing the present invention embodiments. In FIG. 3, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is

1. A method of performing measurement sampling in a production process, the method comprising:
   passing a lot through at least one tool in a manufacturing process;
   processing the lot at the at least one tool;
   determining a process sequence of the lot;
   employing a set of combinational logistics in a lot sampling engine to determine if sampling is indicated and, if sampling is indicated, establishing a sampling decision;
   querying a set of lot sampling rules from the lot sampling engine to evaluate the sampling decision;
   evaluating a statistical quality of the process if no set of lot sampling rules exists; and
   automatically determining whether the lot passing through the manufacturing process requires sampling based on the process sequence, combinational logistics, statistical quality and lot sampling rules.

2. The method of claim 1, further comprising: determining whether the manufacturing process requires additional controls.

3. The method of claim 2, further comprising: comparing the combinational logistics with a set of process specific lot sampling rules if the manufacturing process requires additional rules.

4. The method of claim 1, wherein evaluating the statistical quality of the manufacturing process includes employing a process capability index (CpK) metric to evaluate the manufacturing process.

5. The method of claim 1, further comprising:
   determining whether the lot is one of a rework lot and a previously measured lot; and
   flagging the lot for sampling immediately after querying the set of lot sampling rules to evaluate the sampling decision if the lot is one of a rework lot and a previously measured lot.

6. The method of claim 1, wherein employing a set of combinational logistics to determine if sampling is indicated comprises querying a logical recipe including at least one of a process definition identifier and a route identifier.

7. The method of claim 1, wherein evaluating the statistical quality of the process includes evaluating a percentage of hardware sampled against user defined rates.

8. The method of claim 1, further comprising: manually overriding the sampling decision.

9. A system for sampling lots in a production process comprising:
   a central processing unit (CPU), said CPU being interconnected functionally via a system bus to:
      an input/output (I/O) adapter connecting to at least one of a removable data storage device, a program storage device, and a mass data storage device;
      a user interface adapter connecting to a keyboard and a mouse;
      a display adapter connecting to a display device; and
      at least one memory device thereupon stored a set of instructions which, when executed by said CPU, causes said system to:
         pass a lot through at least one tool in a manufacturing process;
         process the lot at the at least one tool;
         determine a process sequence of the lot;
         employ a set of combinational logistics to determine if sampling is indicated and, if sampling is indicated, establishing a sampling decision;
         query a set of lot sampling rules to evaluate the sampling decision;
         evaluate a statistical quality of the process if no set of lot sampling rules exists; and
         automatically determine whether the lot passing through the manufacturing process requires sampling based on the process sequence, combinational logistics, statistical quality and lot sampling rules.

10. The system of claim 9, wherein the set of instructions which, when executed by said CPU, causes said system to: determine whether the manufacturing process requires additional controls.

11. The system of claim 10, wherein the set of instructions which, when executed by said CPU, causes said system to: compare the combinational logistics with a set of process specific lot sampling rules if the manufacturing process requires additional rules.

12. The system of claim 9, wherein the set of instructions which, when executed by said CPU, causes said system to: evaluate the statistical quality of the manufacturing process by employing a process capability index (CpK) metric to evaluate the manufacturing process.

13. The system of claim 9, wherein the set of instructions which, when executed by said CPU, causes said system to:
   determine whether the lot is one of a rework lot and a previously measured lot; and
   flag the lot for sampling immediately after querying the set of lot sampling rules to evaluate the sampling decision if the lot is one of a rework lot and a previously measured lot.

14. The system of claim 9, wherein the set of instructions which, when executed by said CPU, causes said system to: employ a set of combinational logistics to determine if sampling is indicated by querying a logical recipe including at least one of a process definition identifier and a route identifier.

15. The system of claim 9, wherein the set of instructions which, when executed by said CPU, causes said system to: evaluate the statistical quality of the process by evaluating a percentage of hardware sampled against user defined rates.

16. A computer program product comprising:
   a non-transitory computer useable medium including a computer readable program, wherein the computer readable program when executed on a computer causes the computer to implement a method of performing measurement sampling in a production process, the method further comprising:
      pass a lot through at least one tool in a manufacturing process;
      process the lot at the at least one tool;
      determine a process sequence of the lot;
      employ a set of combinational logistics to determine if sampling is indicated and, if sampling is indicated, establishing a sampling decision;
      query a set of lot sampling rules to evaluate the sampling decision;
   evaluate a statistical quality of the process if no set of lot sampling rules exists; and
      automatically determine whether the lot passing through the manufacturing process requires sampling based on the process sequence, combinational logistics, statistical quality and lot sampling rules.

17. The computer program product of claim 16, wherein the computer readable program when executed on a computer causes the computer to: determine whether the manufacturing process requires additional controls.

18. The computer program product of claim 17, wherein the computer readable program when executed on a computer causes the computer to: compare the combinational logistics with a set of process specific lot sampling rules if the manufacturing process requires additional rules.

19. The computer program product of claim 16, wherein the computer readable program when executed on a computer causes the computer to: evaluate the statistical quality of the manufacturing process by employing a process capability index (CpK) metric to evaluate the manufacturing process.

20. The computer program product of claim 16, wherein the computer readable program when executed on a computer causes the computer to:
   determine whether the lot is one of a rework lot and a previously measured lot; and
   flag the lot for sampling immediately after querying the set of lot sampling rules to evaluate the sampling decision if the lot is one of a rework lot and a previously measured lot.

21. The computer program product of claim 16, wherein the computer readable program when executed on a computer causes the computer to: employ a set of combinational logistics to determine if sampling is indicated by querying a logical recipe including at least one of a process definition identifier and a route identifier.

22. The computer program product of claim 16, wherein the computer readable program when executed on a computer causes the computer to: evaluate the statistical quality of the process by evaluating a percentage of hardware sampled against user defined rates.

* * * * *